Patented Nov. 11, 1924.

1,515,182

UNITED STATES PATENT OFFICE.

SAMUEL A. TURNER, OF BROOKLYN, NEW YORK, ASSIGNOR TO PATHÉ CHEMICAL COMPANY, OF BROOKLYN, NEW YORK, A CORPORATION OF DELAWARE.

PROCESS FOR FIBER TREATMENT AND PRODUCTS SUITABLE THEREFOR.

No Drawing.   Application filed April 25, 1923.   Serial No. 634,606.

*To all whom it may concern:*

Be it known that I, SAMUEL A. TURNER, a citizen of the United States, residing at Brooklyn, county of Kings, city of New York, and State of New York, have invented new and useful Improvements in Processes for Fiber Treatment and Products Suitable Therefor, of which the following is a full, clear, and exact specification.

My invention relates to methods and means for the treatment of fibers and refers particularly to products suitable for moth-proofing fibers and methods for their production.

The devastation, due to the insect destruction of fibers is well known, the chief cause of damage being incident to the attacks of moth upon woolen fibers and fabrics.

Numerous means have been suggested for the prevention of this destruction, but they are usually of a local and transient character, the fiber not being protected from the attacks of the insects after removal from actual contact with the extraneous repellent material.

It is evident that the proper and only efficient means for protecting fiber from insects is to incorporate within the fiber some insect repellent means which will practically remain in contact with the fiber during the various treatments to which it may be subjected during manufacture and use and which will at the same time be of such a character as not to materially change the desirable chemical and physical characteristics of the fiber itself.

Fiber, when treated as above, will be insect-proof at all times and will not need an additional protective treatment during storage.

The products of my invention possess all of the desirable characteristics and present an effective, economical and easily applied means whereby fibers, and especially wool fibers, may be practically permanently protected against the attacks of insects, and especially from so-called moths.

I have found that moth-proof compounds for application to wool fibers may be produced by the interaction of salts of naphthalene compounds, with sulphates and fluorides and that wool fibers treated with said compounds are practically permanently resistant to moth attacks, or possess repellent attributes preventing such attacks.

I have found in a general way that compounds suitable for the described purposes may be produced by the interaction of salts of the sulphonic acid of naphthalene, especially the metallic salts of the mono-sulphonic acids, sulphates, especially the metallic sulphates, and compounds of fluorine.

Among the compounds which I have found particularly adaptable to my process are the aluminium and zinc salts of naphthalene-alpha-mono-sulphonic acid and naphthalene-beta-mono-sulphonic acid; aluminium and zinc sulphates; and the fluorides of aluminium, zinc, sodium, potassium and ammonium, although my invention is not limited to the particular mentioned compounds, as others may be substituted therefor.

In a general way, the application of my wool-proofing compounds consists in treating the well cleansed wool with formic acid and then treating it with a solution of my compounds and drying, although this specific method may be varied, without going beyond the scope of my invention.

Wool thus treated possesses all of its original physical characteristics and is practically permanently resistant to moths and their larvæ.

The following is given as an example of one method of producing the compounds of my invention and of their application to wool:—

I dissolve 20 parts by weight of zinc beta-mono-sulphonate of naphthalene in 200 parts by weight of water. To this solution I add, preferably slowly, 56 parts by weight of zinc sulphate ($ZnSO_4.7H_2O$) and stir at a gentle boil until it is dissolved. I then add 24 parts by weight of ammonium fluoride ($NH_4Fl$) and maintain the boiling temperature until it is dissolved. The liquid is then filtered, evaporated to dryness and ground, preferably into a very fine powder.

Aqueous solutions of the zinc sulphate and aluminium fluoride may be substituted for the solids mentioned above.

The resulting compounds from the above example process may be applied to the wool as follows:—

The wool is thoroughly cleaned, as, for example, by scouring with potassium carbonate and ammonia at 60° C. for one hour and then well rinsed, and is then worked for one-half hour in a solution containing 10% of formic acid 85% estimated upon the weight of the wool. The thus treated wool is then introduced into an aqueous solution containing 20% of the above example compounds estimated upon the weight of the wool and worked therein for two hours at a temperature of 25° C. to 30° C. The treated wool is then removed, well rinsed with water and dried at about 70° C.

Both the formic acid bath and the wool resistant compounds bath may be employed for future wool treatments, in which event 2½% formic acid 85%, estimated upon the weight of the wool and 2½% wool resistant compounds estimated upon the weight of the wool, may be added to the respective baths.

Wool thus treated exhibits no appreciable loss or change of its physical properties and possesses resistant properties against the ravages of moths and their larvæ.

I do not limit myself to the particular chemicals, amounts, temperatures, times of treatment, or steps of process described above, as they are given simply as a means for clearly describing my invention.

What I claim is:—

1. In a process for the production of moth-resistant compounds, the step which comprises heating a solution of a salt of naphthalene sulphonic acid, a sulphate and a fluoride.

2. In a process for the production of moth-resistant compounds, the step which comprises dissolving a sulphate and a fluoride in a solution of a salt of naphthalene sulphonic acid.

3. In a process for the production of moth-resistant compounds, the step which comprises heating a solution of a metallic salt of naphthalene sulphonic acid, a sulphate and a fluoride.

4. In a process for the production of moth-resistant compounds, the step which comprises dissolving a sulphate and a metallic fluoride in a solution of a salt of naphthalene sulphonic acid.

5. In a process for the production of moth-resistant compounds, the step which comprises dissolving a sulphate and aluminium fluoride in a solution of a salt of naphthalene sulphonic acid.

6. In a process for the production of moth-resistant compounds, the step which comprises dissolving zinc-sulphate and aluminium fluoride in a solution of a salt of naphthalene mono-sulphonic acid.

7. In a process for the production of moth-resistant compounds, the step which comprises dissolving zinc-sulphate and aluminium fluoride in a solution of a metallic salt of naphthalene mono-sulphonic acid.

8. In a process for the production of moth-resistant compounds, the step which comprises dissolving zinc-sulphate and aluminium fluoride in a solution of the zinc salt of naphthalene mono-sulphonic acid.

9. The product producible by treating a solution of a salt of naphthalene sulphonic acid with a sulphate and a fluoride and drying the result, which product is soluble in water and imparts moth-resistant properties to wool fibers.

10. The product producible by treating a solution of a metallic salt of a naphthalene sulphonic acid with a sulphate and a fluoride and drying the result, which product is soluble in water and imparts moth-resistant properties to wool fibers.

11. The product producible by treating a solution of a metallic salt of a naphthalene sulphonic acid with a sulphate and a metallic fluoride and drying the result, which product is soluble in water and imparts moth-resistant properties to wool fibers.

12. The product producible by treating a solution of a metallic salt of a naphthalene sulphonic acid with a sulphate and aluminium fluoride and drying the result, which product is soluble in water and imparts moth-resistant properties to wool fibers.

13. The product producible by treating a solution of zinc salt or of a napthalene mono-sulphonic acid with zinc-sulphate and aluminium fluoride and drying the result, which product is soluble in water and imparts moth-resisting properties to wool fibers.

14. The process of rendering fibers moth-proof which comprises treating the fiber with formic acid and then with a solution of the product produced by treating a solution of a salt of a napthalene sulphonic acid with a sulphate and a fluoride.

15. The process of rendering fibers moth-proof which comprises treating the fiber with formic acid and then with a solution of the product produced by treating a solution of a metallic salt of a napthalene sulphonic acid with a sulphate and a fluoride.

16. The process of rendering fibers moth-proof which comprises treating the fiber with formic acid and then with a solution of the product produced by treating a solution of a salt or a naphthalene sulphonic acid with a sulphate and a metallic fluoride.

17. The process of rendering fibers moth-proof which comprises treating the fiber with formic acid and then with a solution of the product produced by treating a solution of a metallic salt of a naphthalene sulphonic acid with a sulphate and a metallic fluoride.

18. The process of rendering fibers mothproof which comprises treating the fiber with formic acid and then with a solution of the product produced by treating a solution of a zinc salt of a naphthalene sulphonic acid with a sulphate and a fluoride.

19. The process of rendering fibers mothproof which comprises treating the fiber with formic acid and then with a solution of the product produced by treating a solution of a salt of a naphthalene sulphonic acid with a sulphate and aluminium fluoride.

20. The process of rendering fibers mothproof which comprises treating the fiber with formic acid and then with a solution of the product produced by treating a solution of a zinc salt of a naphthalene sulphonic acid with a sulphate and aluminium fluoride.

21. The process of rendering fibers mothproof which comprises treating the fiber with formic acid and then with a solution of the product produced by treating a solution of a zinc salt of a naphthalene sulphonic acid with zinc-sulphate and aluminium fluoride.

22. The process of rendering fibers mothproof which comprises treating the fiber with formic acid and then with a solution of the product produced by treating a solution of a zinc salt of naphthalene mono-sulphonic acid with zinc-sulphate and aluminium fluoride.

Signed at New York city, in the county of New York and State of New York, this 23rd day of April, 1923.

SAMUEL A. TURNER.